United States Patent
Pesenti

(10) Patent No.: US 11,841,102 B2
(45) Date of Patent: Dec. 12, 2023

(54) CRS: QUICK CONNECTOR FOR TUNNEL BORING MACHINE SPOIL CHECK

(71) Applicant: BOUYGUES TRAVAUX PUBLICS, Guyancourt (FR)

(72) Inventor: Herve Pesenti, Montluel (FR)

(73) Assignee: BOUYGUES TRAVAUX PUBLICS, Guyancourt (FR)

(*) Notice: Subject to any disclaimer, the term of this patent is extended or adjusted under 35 U.S.C. 154(b) by 45 days.

(21) Appl. No.: 17/597,487

(22) PCT Filed: Jul. 9, 2020

(86) PCT No.: PCT/EP2020/069421
§ 371 (c)(1),
(2) Date: Jan. 7, 2022

(87) PCT Pub. No.: WO2021/005170
PCT Pub. Date: Jan. 14, 2021

(65) Prior Publication Data
US 2022/0275893 A1  Sep. 1, 2022

(30) Foreign Application Priority Data
Jul. 9, 2019 (FR) ..................................... 1907675

(51) Int. Cl.
*F16L 33/28* (2006.01)
*E21D 9/12* (2006.01)
*F16L 33/16* (2006.01)

(52) U.S. Cl.
CPC ................ *F16L 33/28* (2013.01); *E21D 9/12* (2013.01); *F16L 33/16* (2013.01)

(58) Field of Classification Search
CPC . F16L 33/28; F16L 33/16; F16L 23/04; F16L 23/08; F16L 25/06; F16L 57/005; F16L 57/00; E21D 9/12; E21D 9/0874
(Continued)

(56) References Cited

U.S. PATENT DOCUMENTS 3,231,297 A * 1/1966 Watts ...................... F16L 23/04
285/411
4,441,742 A * 4/1984 Owens, III ............ E21B 33/038
285/920
(Continued)

FOREIGN PATENT DOCUMENTS

DE           3524074 A1    1/1987
DE    102015110017 A1   12/2016
(Continued)

OTHER PUBLICATIONS

International Preliminary Report on Patentability received for PCT Patent Application No. PCT/EP2020/069421, dated Jan. 20, 2022, 15 pages (8 pages of English Translation and 7 pages of Original Document).

(Continued)

*Primary Examiner* — David Bochna
(74) *Attorney, Agent, or Firm* — WOMBLE BOND DICKINSON (US) LLP

(57) ABSTRACT

A connector for a mucking duct of a tunnel boring machine including a fitting having a first end configured to be added and fastened onto the flexible pipe of the mucking duct and a second end configured to be mounted on an additional duct section, and a clamping device, mounted in the fitting and configured to block the additional duct section relative to the fitting.

10 Claims, 3 Drawing Sheets

(58) Field of Classification Search
USPC .......................................... 285/23, 366, 364
See application file for complete search history.

(56) References Cited

U.S. PATENT DOCUMENTS

| | | | | |
|---|---|---|---|---|
| 4,741,559 | A * | 5/1988 | Berghman | F16L 35/00 |
| | | | | 285/419 |
| 5,951,066 | A * | 9/1999 | Lane | F16L 25/065 |
| | | | | 285/364 |
| 6,267,419 | B1 * | 7/2001 | Baker | F16L 37/002 |
| | | | | 285/364 |
| 8,211,518 | B2 | 7/2012 | Fernandes et al. | |
| 8,256,800 | B2 * | 9/2012 | Ward | F16L 25/14 |
| | | | | 285/236 |
| 8,740,260 | B1 * | 6/2014 | Liew | E21B 17/046 |
| | | | | 285/364 |
| 2019/0264563 | A1 * | 8/2019 | Su | E21D 9/0874 |

FOREIGN PATENT DOCUMENTS

| | | |
|---|---|---|
| EP | 1281835 A1 | 2/2003 |
| EP | 2112414 A1 | 10/2009 |
| GB | 1562054 A | 3/1980 |

OTHER PUBLICATIONS

International Search Report and Written Opinion received for PCT Patent Application No. PCT/EP2020/069421, dated Oct. 8, 2020, 18 pages (8 pages of English Translation and 10 pages of Original Document).

Preliminary Research Report received for French Application No. 1907675, dated Mar. 2, 2020, 5 pages (1 page of French Translation Cover Sheet and 4 pages of original document).

* cited by examiner

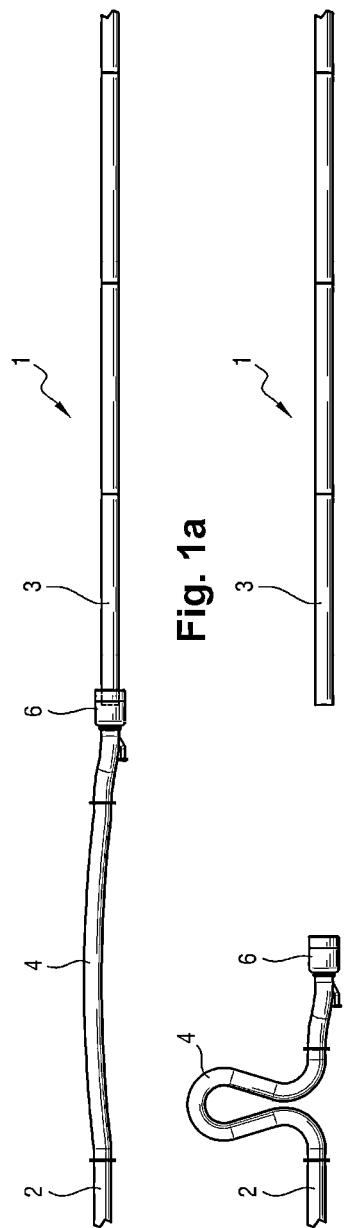
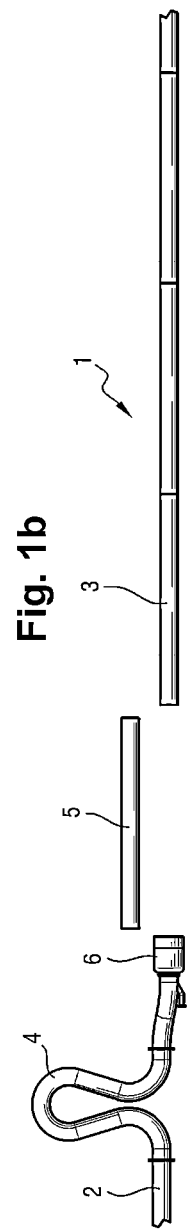
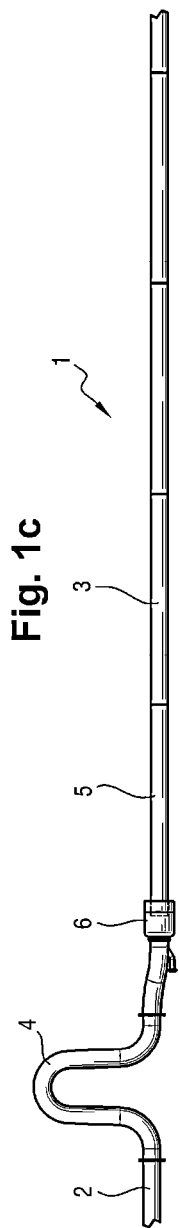
Fig. 1a  Fig. 1b  Fig. 1c  Fig. 1d

CRS: QUICK CONNECTOR FOR TUNNEL BORING MACHINE SPOIL CHECK

FIELD OF THE INVENTION

The invention relates generally to the drilling of a tunnel, and more particularly to the removal of the cuttings generated by such drilling, in particular in the case of a slurry pressure tunnel boring machine.

STATE OF THE ART

Tunneling machines called tunnel boring machines are known, which include a movable structure with large dimensions consisting of a large mobile plant at the front of which is disposed a shield having a section compatible with the future section in line with the final shape of the tunnel (tunnel of circular section, bilobed tunnel, etc.).

The anterior part of the shield which comes into contact with the working face to make the cutting of the geological formation through which the tunnel passes includes a cutting wheel supporting work tools which is driven in rotation at a variable speed and which is coupled to a thrust that is adapted to the nature of the ground to dig.

The cutting wheel works under pressure. It is mounted at the front of a chamber, called extraction chamber, according to the direction of movement of the tunnel boring machine. The rear part of the tunnel boring machine, called the back-up train, comprises, in addition to various apparatuses allowing the circulation of the fluids between the tunnel and the surface (outlet of the tunnel), all of the devices for controlling, placing and ensuring the safety of arch segments constituting the tunnel. Slurry is injected under pressure at the front of the working face from the extraction chamber. The function of this slurry is to lubricate the cutting wheel, to ensure the stability of the walls of the excavation and, during its return back to the surface, to smooth the transport of the materials (the muck spoil) derived from the excavation.

In a manner known per se, the muck spoil is transported from the cutting wheel to the surface by one or several mucking duct(s). Each mucking duct comprises an outlet line, connected to the cutting head of the tunnel boring machine, a downstream, fixed and rigid section connected to a slurry treatment station and a flexible pipe connecting the outlet line and the downstream section. To allow the advancement of the tunnel boring machine, the flexible pipe is bent so as to create a clearance between the line and the downstream section, then gradually unfolds during the advancement of the tunnel boring machine until it is substantially extended. At the end of stroke, the flexible pipe is disconnected and folded. An additional rigid duct section is then added and inserted between the flexible pipe and the downstream section. The new duct being thus connected, the tunnel boring machine can continue its advance.

However, the mounting of the additional section is long and requires heavy handling. Indeed, the downstream section must be separated from the outlet line by dismounting a clamping collar, then an additional section must be brought and positioned properly relative to the downstream section and the outlet line before mounting a first clamping collar between this additional section and the outlet line and a second clamping collar between the additional section and the downstream section on the other hand. The mounting of the collars involves properly aligning the additional duct with the outlet line and with the front section, by simultaneously holding a clamping collar, bolts and an impact wrench. The connection operation also requires that the operators support and hold in position the duct sections facing each other during the clamping of each collar, which is very heavy, and the fastening of the bolts, which is difficult given the space requirement of the duct sections and their weight. In addition, this operation is delicate since it is necessary for these elements to be assembled accurately to guarantee the mounting of the collars. In the event of failure, these various steps must be repeated.

DISCLOSURE OF THE INVENTION

An object of the invention is to propose a solution for the mounting of a mucking duct section which is simpler, easier to handle for the operators, safer and which guarantees the proper positioning of the different sections of the duct.

To this end, it is proposed, according to a first aspect of the invention, a connector for a mucking duct of a tunnel boring machine, the mucking duct comprising:
 an outlet line, connected to a cutting head of the tunnel boring machine,
 a duct section, and
 a flexible pipe, connecting the outlet line and the duct section.
In particular, the connector comprises:
 a fitting having a first end configured to be added and fastened onto the flexible pipe and a second end configured to be mounted on an additional duct section, and
 a clamping device, mounted in the fitting and configured to block the additional section relative to the fitting.

Some preferred but non-limiting characteristics of the connector described above are the following, taken individually or in combination:
 the fitting further comprises, at the second end, means for centering the additional duct section relative to the fitting.
 the centering means comprise a conical centering guide.
 the connector further comprises an actuator configured to open and/or close the clamping device. And/or
 the actuator comprises at least one cylinder, for example two cylinders.

According to a second aspect, the invention proposes a mucking duct of a tunnel boring machine comprising:
 an outlet line, connected to a cutting head of the tunnel boring machine,
 a first duct section, and
 a flexible pipe, connecting to the outlet line and the first duct section.

It further comprises a connector as described above, the first end of the fitting being fastened onto the flexible pipe.

According to a third aspect, the invention proposes a method for mounting such a mucking duct of a tunnel boring machine comprising the following steps:
 S2: bringing an additional duct section,
 S3: aligning the additional duct section relative to the connector then inserting said additional duct section into the second end of the fitting of the connector,
 S4: closing the clamping device on the additional duct section in order to block it relative to the fitting.

Some preferred but non-limiting characteristics of the mounting method described above are the following, taken individually or in combination:
 the alignment step S3 comprises a sub-step of guiding the additional duct section using centering means extending at the second end of the fitting. And/or, the step S2 comprises a sub-step of positioning the additional duct section using a system for positioning said additional duct section relative to the fitting.

DESCRIPTION OF THE FIGURES

Other characteristics, aims and advantages of the invention will emerge from the following description which is purely illustrative and not limiting, and which should be read with reference to the appended drawings wherein:

FIGS. 1a to 1d illustrate the mounting of an additional section of a mucking duct during the advance of a tunnel boring machine according to one embodiment of the invention.

In all of the figures, similar elements bear identical references.

DETAILED DESCRIPTION OF THE INVENTION

Figures 2, 3:
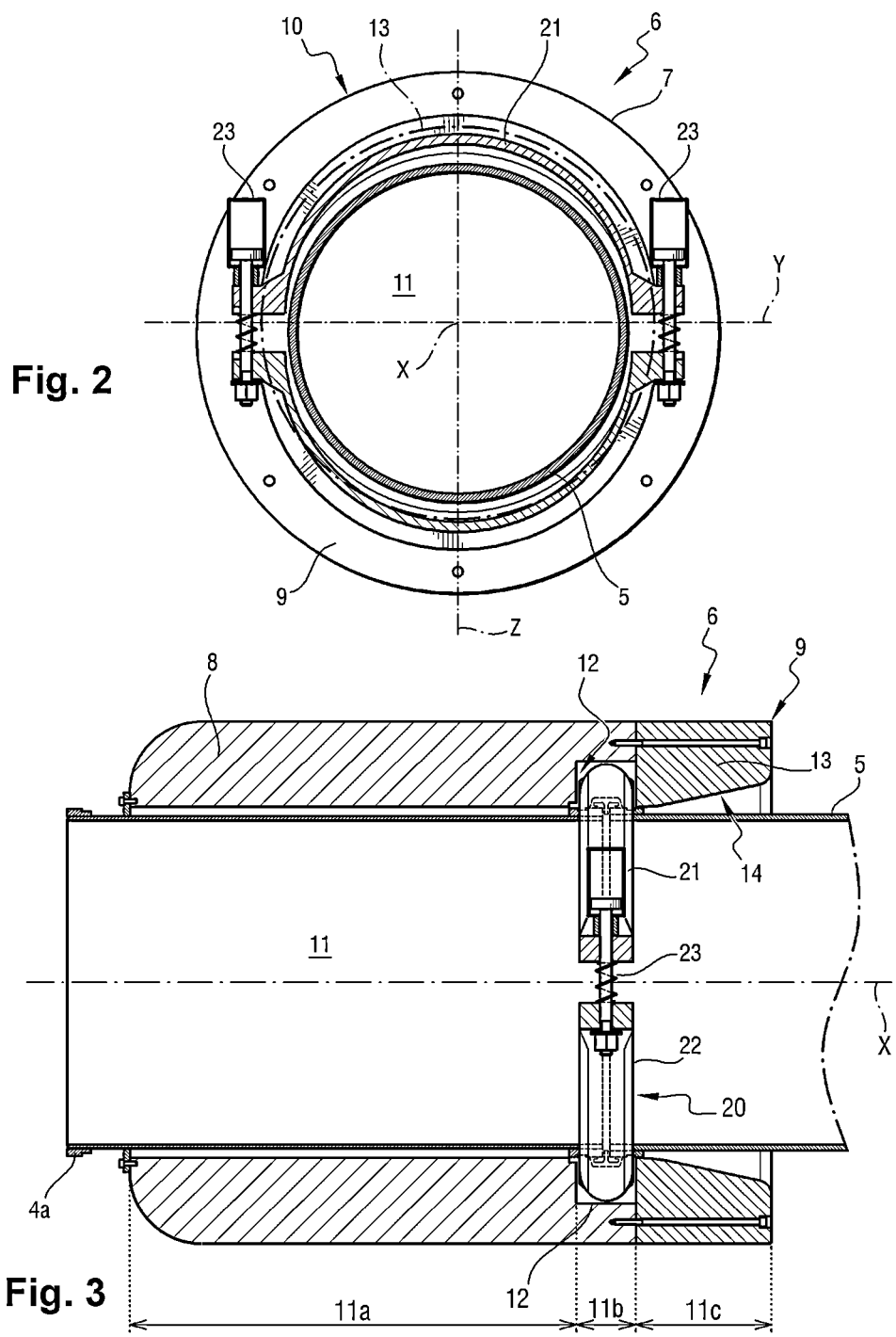
FIG. 2 is a sectional view along a plane normal to the axis X of one exemplary embodiment of a connector for a mucking duct of a tunnel boring machine according to one embodiment of the invention.
FIG. 3 is a sectional view along a plane normal to the axis Y and comprising the axis X of the connector of FIG. 2.
Figure 4:
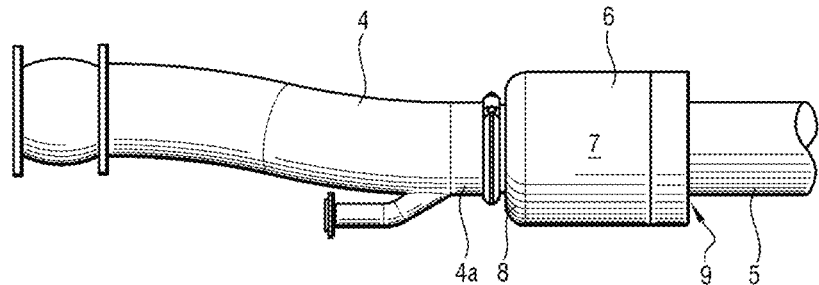
FIG. 4 is a side view of one exemplary embodiment of a mucking duct of a tunnel boring machine according to one embodiment of the invention.
Figure 5:
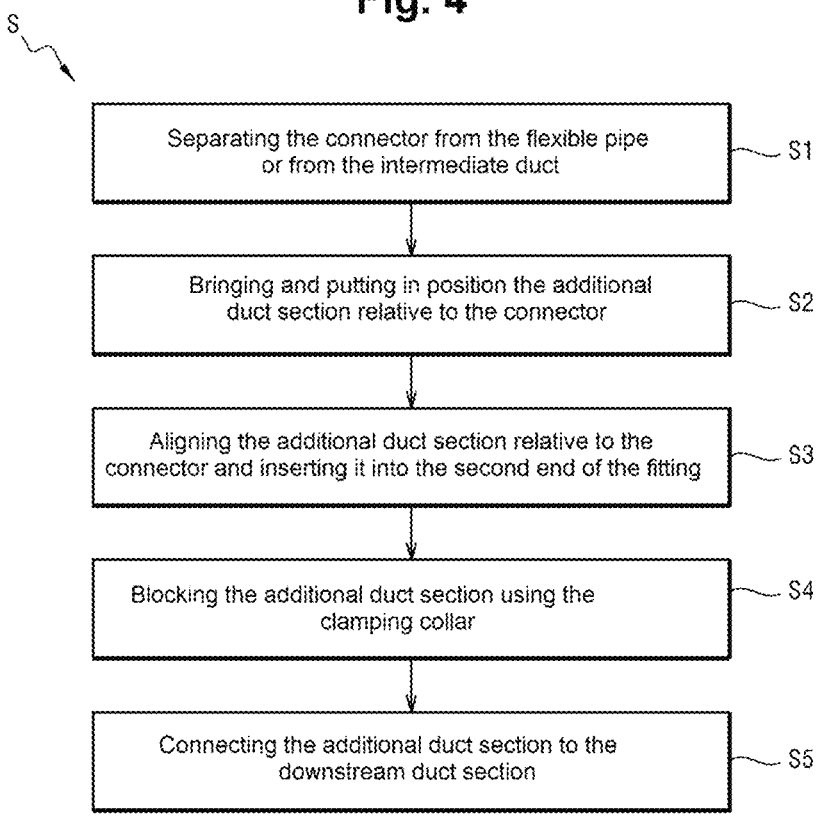
FIG. 5 is a flow chart of steps of one exemplary embodiment of a method for mounting a mucking duct of a tunnel boring machine according to one embodiment of the invention.

Conventionally, a tunnel boring machine comprises, in the front part, a shield having a substantially circular section whose diameter corresponds to the diameter of the tunnel which is dug. The shield houses a cutting wheel which comes into contact with the working face to dig the tunnel and which is movable in rotation about an axis.

The tunnel boring machine further includes a back-up train extending behind the shield and which advances at the same time as the cutting wheel during the digging of the tunnel.

In a manner known per se, the cutting wheel is mounted at the front of an extraction chamber. Slurry is injected under pressure at the front of the leading face from the extraction chamber, and the muck spoil is transported from the cutting wheel to the surface by one or several mucking duct(s) 1.

Each mucking duct 1 comprises an outlet line 2, connected to the cutting head of the tunnel boring machine (at the level of the extraction chamber), a downstream duct section 3 connected to a slurry treatment station and a flexible pipe 4 connecting the outlet line 2 and the downstream section 3.

FIGS. 1a to 1d illustrate the mounting of an additional section 5 of a mucking duct 1 during the advance of a tunnel boring machine.

In FIG. 1a, the flexible pipe 4 is stretched between the outlet line 2 and the downstream section 3 of the mucking duct 1. There is therefore no longer sufficient clearance to allow the tunnel boring machine to continue its advance, the downstream section 3 being fixed.

The flexible pipe 4 is then separated from the downstream section 3 and then bent so as to recreate a clearance (FIG. 1b).

An additional duct section 5 is then added between the flexible pipe 4 and the downstream section 3 of the duct (FIG. 1c).

The downstream duct section 3 and the additional section 5 are rigid.

Finally, the additional section 5 is connected to the flexible pipe 4 and to the downstream section 3, where appropriate via an intermediate duct section 4a so as to return the extraction chamber and the slurry treatment station into fluid communication. The tunnel boring machine can then resume the digging and advance.

In order to simplify the mounting of the additional section 5 on the flexible pipe of the mucking duct 1, the invention proposes a connector 6 comprising:
  a fitting 7 having a first end 8 configured to be added and fastened onto the flexible pipe 4 and a second end 9 configured to be mounted on an additional duct section 5, and
  a clamping device 20, mounted in the fitting 7 and configured to block the additional section 5 relative to the fitting 7. In one embodiment, the clamping device 20 further allows providing the sealing between the additional section 5 and the fitting 7. For example, the clamping device 20 may comprise a clamping collar or as a variant any locking and where appropriate sealing system capable of blocking the additional section 5 in position relative to the fitting 7.

Such a connector 6 thus allows simplifying the handling of the additional section 5 since it eliminates the step of mounting a new collar on the end of the additional section 5 which is connected to the flexible pipe 4. As will be seen thereafter, the use of a fitting 7 further allows simplifying and improving the alignment of the additional section 5 with the flexible pipe 4 upon their fastening.

In the following, "longitudinal axis X" will designate a central axis of the connector 6, typically an axis of symmetry when the connector 6 is generally cylindrical of revolution. When the connector 6 is mounted on the additional section 5, the axis X is substantially coincident with the axis of revolution of said additional section 5. "Vertical axis Z" will designate an axis comprised in the plane normal to the longitudinal axis X and which is substantially normal to the ground on which the connector 6 is laid, and "transverse axis Y" will designate an axis perpendicular to the vertical axis Z and to the longitudinal axis X.

The fitting 7 is configured to be mounted, directly or indirectly, on the flexible pipe 4. In one embodiment, the flexible pipe 4 is fastened onto an intermediate section 4a, which is rigid, and which is itself fastened onto the first end 8 of the fitting 7.

In the following, the invention will be described in the case where the fitting 7 is mounted on the flexible pipe 4 via an intermediate section 4a, without this being limiting.

The fitting 7 comprises a shell 10 which delimits a chamber 11 configured to receive an end of the additional section 5. The chamber 11 is a through-chamber between the first end 8 and the second end 9 in order to allow the passage of the muck spoil.

The chamber 11 has a first portion 11a, configured to receive the intermediate section 4a, a second portion 11b configured to receive the clamping device 20 and a third portion 11c configured to receive the additional section 5.

The first portion 11a opens onto the first end 8 and is generally cylindrical of revolution. It has a diameter substantially equal to the outer diameter of the intermediate section 4*a*. The intermediate section 4*a* is then fastened in position in the chamber 11 using a fastening system such as a collar.

Similarly, the third portion 11*c* opens onto the second end 9 and is generally cylindrical of revolution and has a diameter at the interface with the second portion 11*b* substantially equal to the outer diameter of the additional section 5. The diameter of the third portion 11*c* can be substantially constant over its entire length along the axis X or, as a variant, as will be seen later, decreasing from the second end 9 towards the second (centering) portion 11*b*.

The second portion 11*b* extends between the first and the third portion 11*a*, 11*c* and receives the clamping device 20. The diameter of the second portion 11*b* is greater than that of the first portion 11*a* and of the third portion 11*c* (at least at the interface with the third portion 11*c*) in order to form a housing for the clamping device 20. The clamping device 20 is therefore blocked in the housing 12 and comes into axial abutment along the axis X and into radial abutment along the axes Y and Z (when the clamping device 20 is open) against the shell 10 of the fitting 7.

In one embodiment, the clamping device 20 comprises a clamping collar 20 including two half-collars 21, 22 configured to be engaged in order to block the additional section 5 relative to the fitting 7. The opening and the closing (engagement) of the clamping device 20, typically of the two half-collars 21, 22 can be manual or alternatively automated. For example, in the case of a clamping device 20 comprising a clamping collar, the connector 6 can further comprise an actuator 23 housed in the chamber 11 and configured to engage and hold in position the half-clamps 21, 22 or, conversely, separate them. The actuator can in particular comprise a cylinder, for example two cylinders each placed on either side of the half-collars 21, 22.

In one embodiment, the connector 6 further comprises means for centering 13 the additional section 5 relative to the connector 6 and, consequently, relative to the intermediate section 4*a* and to the flexible pipe 4.

The centering means 13 extend at the second end 9 of the fitting 7. In one embodiment, the centering means 13 delimit the third portion 11*c* of the chamber 11.

The centering means 13 can comprise a conical centering guide. The guide 13 comprises to this end a substantially cylindrical wall 14 of revolution having an inner face of conical shape so that its diameter at the inlet to the chamber 11 (at the second end 9 of the fitting 7) is larger than its diameter at the interface with the second portion 11*b*. In addition, the inner diameter of the guide 13 at its interface with the second portion 11*b* of the chamber 11 is substantially equal to the outer diameter of the additional section 5. The inner wall 14 thus allows guiding the additional section 5 up to the second end 9 of the fitting 7 and centering it gradually.

The method S for mounting the additional section 5 of the mucking duct 1 on the intermediate section 4*a* can then be carried out in accordance with the following steps.

During a step S1, the connector 6 is separated from the downstream section 3 of the mucking duct and the flexible pipe 4 is folded so as to arrange a clearance between the outlet line and the mucking duct (FIG. 1*b*). For that purpose, the clamping device 20 is opened, manually or automatically. For example, in the case of a clamping collar 20, the half-collars 21, 22 of the clamping collar 20 are separated, where appropriate using the actuator 23. The bending of the flexible pipe 4 and the opening of the clamping collar 20 then have the effect of dislodging the downstream section 3 of the first portion 11*a* of the chamber 11 of the fitting 7.

Preferably, the clamping device 20 remains housed in the connector 6, typically in the housing 12. Particularly, the clamping device 20 does not remain mounted on the downstream section 3 of the mucking duct 1 after its separation from the connector 6. This indeed allows journeymen to avoid dismounting the clamping device 20 from the downstream section 3 and then remounting it on the additional section 5, thus simplifying the handling.

Conventionally, the flexible pipe 4, the intermediate section 4*a* and therefore the connector 6 are placed on a movable base in order to move them upon the mounting of the additional section 5.

The connector 6 is then only fastened to the intermediate section 4.

During a step S2 (FIG. 1*c*), the additional section 5 is brought and put into position between the connector 6 and the downstream section 3, which is fastened and rigid. Particularly, the additional section 5 is positioned along the axes X, Y and Z relative to the fitting 7 and to the intermediate section 4*a*.

For that purpose, the additional section 5 can in particular be moved and positioned using a chain hoist.

As a variant, a chain hoist can place the additional section on a positioning system comprising a support movable in translation along the longitudinal axis X and/or the vertical axis Z and/or the transverse axis Y in order to allow a first adjustment of the position of the additional section 5 relative to the connector 6 along these axes X, Y and/or Z. The support can for example be moved by one or several cylinder(s) along these axes X, Y and/or Z.

This first adjustment has the advantage of facilitating the handling operations by eliminating the use of the chain hoist for the positioning.

During a step S3 (FIG. 1*d*), the additional section 5 is aligned relative to the fitting 7 of the connector 6 and then inserted into the second end 9 of said fitting 7.

Optionally, the method S for aligning the additional section 5 relative to the fitting 7 can be improved thanks to the centering means 13. Particularly, the centering means 13, and particularly the inner wall 14 in the case of a conical centering guide, assist the journeyman upon the insertion of the additional section 5 into the second end 9 of the fitting 7 by gradually aligning the additional section 5 with the axis X as it is inserted along the axis X.

During a step S4, the clamping device 20 is closed in order to block the additional duct section 5 relative to the fitting 7, and therefore relative to the intermediate section 4*a* and to the flexible pipe 4. For example, in the case of a clamping collar 20, the clamping half-collars 21, 22 are engaged and clamped on the additional duct section 5 and the fitting 7.

During a step S5, the additional section 5 can be connected to the downstream section 3. This step S5 being conventional, it will not be further detailed here.

It will of course be understood that the step S5 can be implemented at any time between the separation of the downstream duct (step S1) of the fitting 7 and the blocking of the additional section 5 in the connector 6 (step S4).

The invention claimed is:
1. A mucking duct of a tunnel boring machine comprising:
an outlet line configured to be connected to a cutting head of the tunnel boring machine;
a duct section;
a flexible pipe connecting the outlet line and the duct section; and a connector comprising:
  a fitting having a first end fastened to the flexible pipe and a second end configured to be mounted on an additional duct section; and
  a clamping device mounted in the fitting and configured to block the additional duct section relative to the fitting.

2. The mucking duct according to claim 1, wherein the fitting further comprises, at the second end, means for centering the additional duct section relative to the fitting.

3. The mucking duct according to claim 2, wherein the means for centering comprise a conical centering guide.

4. The mucking duct according to claim 1, further comprising an actuator configured to open or close the clamping device.

5. The mucking duct according to claim 4, wherein the actuator comprises at least one cylinder.

6. A method for mounting a mucking duct of a tunnel boring machine comprising the following steps:
  bringing an additional duct section;
  aligning the additional duct section relative to a connector comprising a fitting having a fist end fastened to a flexible pipe connecting an outlet line of the mucking duct with a duct section, then inserting said additional duct section into a second end of a fitting of the connector;
  closing a clamping device mounted in the fitting of the connector on the additional duct section in order to block the additional duct section relative to the fitting.

7. The method for mounting a mucking duct of a tunnel boring machine according to claim 6, wherein, aligning the additional duct section comprises guiding the additional duct section using centering means extending at the second end of the fitting.

8. The method for mounting a mucking duct of a tunnel boring machine according to claim 6, wherein bringing an additional duct section comprises a positioning the additional duct section using a system for positioning said additional duct section relative to the fitting.

9. The method for mounting a mucking duct of a tunnel boring machine according to claim 6, further comprising a separating step prior to bringing an additional duct section, wherein the connector is separated from a downstream duct section of the mucking duct and the flexible pipe is folded.

10. The method for mounting a mucking duct of a tunnel boring machine according to claim 6, wherein the separating step comprises opening of the clamping device to dislodge the downstream duct section from the fitting.

* * * * *